United States Patent
Li (10) Patent No.: US 7,433,513 B2
(45) Date of Patent: Oct. 7, 2008

(54) SCALING AN ARRAY OF LUMINACE VALUES

(75) Inventor: Guo Li, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 689 days.

(21) Appl. No.: 11/030,795

(22) Filed: Jan. 7, 2005

(65) Prior Publication Data

US 2006/0153441 A1    Jul. 13, 2006

(51) Int. Cl.
G06K 9/00    (2006.01)
(52) U.S. Cl. .................................... 382/167; 382/162
(58) Field of Classification Search ............... 382/167, 382/274, 298, 162, 166, 276, 218, 266, 300, 382/302; 348/65, 70, 71, 655, 673, 652, 348/692, E9.05, E9.053; 345/597; 358/520, 358/447, 518, 521; 375/E7.03, E7.035
See application file for complete search history.

(56) References Cited

U.S. PATENT DOCUMENTS

| | | | | |
|---|---|---|---|---|
| 4,745,465 | A | | 5/1988 | Kwon ........................ 358/522 |
| 5,212,545 | A | * | 5/1993 | Kageyama .................. 348/655 |
| 5,416,533 | A | * | 5/1995 | Kageyama .................. 348/673 |
| 5,617,136 | A | * | 4/1997 | Iso et al. ........................ 348/71 |
| 6,722,751 | B2 | | 4/2004 | Barr et al. ...................... 347/19 |

FOREIGN PATENT DOCUMENTS

| | | | |
|---|---|---|---|
| JP | 02001218070 | * | 8/2001 |
| JP | 02002051231 | * | 2/2002 |

* cited by examiner

*Primary Examiner*—Anh Hong Do (57) ABSTRACT

A method includes scaling up at least one portion of an array of luminance values to generate a matrix having a plurality of expanded luminance values and adjusting at least one value using data selected by one of the expanded luminance values.

62 Claims, 3 Drawing Sheets

SCALING AN ARRAY OF LUMINACE VALUES

BACKGROUND

Significant amounts of memory may be used in performing color image processing operations. Using significant amounts of memory may contribute to an increased hardware cost and an increased time used in performing the operations.

BRIEF DESCRIPTION OF THE DRAWINGS

Embodiments of the present disclosure will be described by way of the accompanying drawings in which like references denote similar elements, and in which.

DETAILED DESCRIPTION

In the following description, various aspects of embodiments of the present disclosure will be described. However, it will be apparent to those skilled in the art, after understanding the present disclosure, that embodiments of the present disclosure may be practiced with only some or all aspects described. For purposes of explanation, specific numbers, materials and configurations are set forth in order to provide a thorough understanding of these embodiments of the present disclosure. However, it will be apparent to one skilled in the art, after understanding the present disclosure, that various embodiments of the present disclosure may be practiced without the specific details. In other instances, features understood by those in the art are omitted or simplified in order not to obscure the disclosed embodiments of the present disclosure.

Various operations will be described as multiple discrete operations in turn, in a manner that is helpful in understanding these embodiments of the present disclosure, however, the order of description should not be construed as to imply that these operations are order dependent, they may or may not be so. In particular, these operations may not be performed in the order of presentation. The phrase "in one embodiment" is used repeatedly. The phrase generally does not refer to the same embodiment, however, it may.

Figure 1:
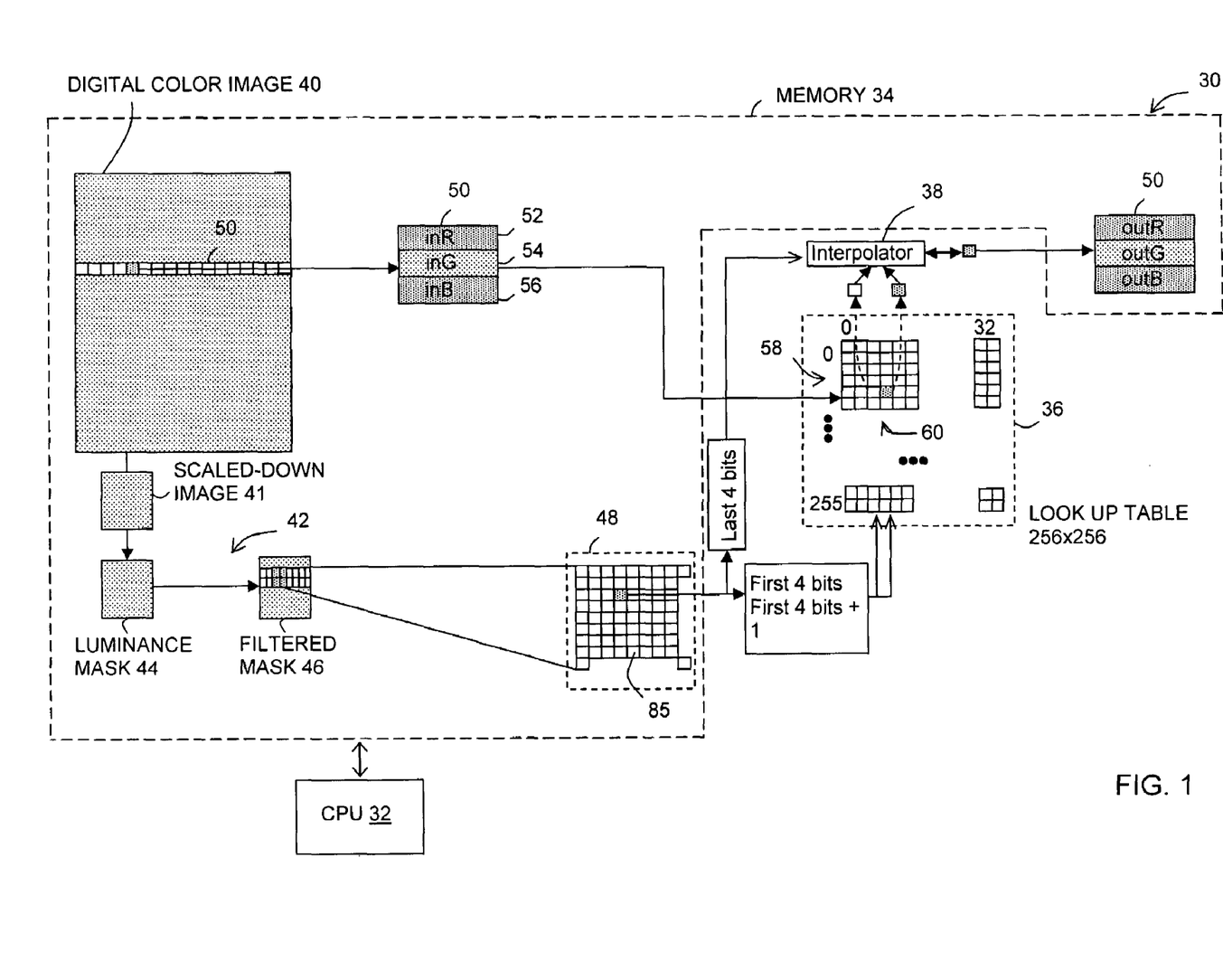
FIG. 1 illustrates a diagram of an embodiment of an imaging processing device according to one embodiment of the present disclosure.

Referring to FIG. 1, there is illustrated an image processing device 30 in accordance with one embodiment of the present disclosure. In one embodiment, the image processing device 30 may be included in a printer. However, the image processing device 30 may be implemented in other devices. The image processing device 30 includes a central processor unit (CPU) 32, a first memory 34 in which digital color images are stored while being processed, a second memory in the form of a look-up table 36 containing data for a plurality of contrast adjustment curves to adjust the contrast of digital color images, and an interpolator 38 for interpolating between contrast adjustment curves.

An overview of the image processing undertaken by the image processing device 30 is first provided. In one embodiment, the device 30 receives a digital color image 40 which is temporarily stored in the first memory 34. The device 30 scales down the digital color image 40 to generate a scaled-down image 41. A luminance channel 42 includes converting the scaled-down image 41 to a luminance mask 44 (gray mask) of starting luminance values, with each of these luminance values being derived from the in R, in G, and in B color values of one of the pixels of the original scaled-down image 41. Luminance gives a measure of the amount of energy an observer perceives from a light source and is one of the basic quantities used to describe light.

The luminance channel 42 further includes using a smoothing filter, such as a Gaussian filter in one embodiment, to generate from the luminance mask 44 a filtered mask 46 with smoothed luminance values. The filtered mask 46 may be generated with reduced computations, due to a smaller neighboring mask being used to process the reduced-size luminance mask 44. In this embodiment, there is a one-to-one pixel correspondence between the pixel arrays of the scaled-down image 41, the luminance mask 44, and the filtered mask 46.

When there is a desire to enhance the contrast of the digital color image 40, small groups or small neighborhoods of pixels in the filtered mask 46 may be scaled-up to generate, one group at a time, a plurality of expanded sub-image matrices 48 of pixels. In one embodiment, one expanded sub-image matrix 48 may exist at a time and be used for image processing; however, if taken as a whole, the sub-image matrices 48 would form an expanded filtered mask. This expanded mask, the whole of which may not exist at one time, also would be the size of the digital color image 40, with there being a one-to-one pixel correspondence between the pixels of the digital color image 40 and the pixels of the expanded mask. In other words, at run time, the filtered mask 46 may be scaled-up or expanded in order to achieve full size and resolution. The luminance values of the sub-image matrices 48 will be referred to as "expanded luminance values" to distinguish them from the "smoothed luminance values" of the filtered mask 46.

The input color values of pixels 50 in the digital color image 40 are processed, e.g., one at a time, by transforming them using at least one of the contrast adjustment curves stored in the look-up table 36. Different regions in one digital color image 40 may be adjusted with different contrast adjustment curves. The appropriate contrast adjustment curve(s) for a given one of the pixels 50 being processed is selected using the expanded luminance value located in the corresponding pixel of one of the expanded sub-image matrices 48 of the expanded filter mask. More specifically, this expanded luminance value is used to select a contrast adjustment curve or two contrast adjustment curves. The color value of the pixel of the image 40 being processed is used to select a curve value from the selected contrast adjustment curve or, in the case of two selected contrast adjustment curves, is used to select a pair of curve values from the pair of contrast adjustment curves. In the case of two curve values, the interpolator 38, based upon the expanded luminance value, interpolates between them to generate an interpolated value.

In comparison with a memory size that would be used without the disclosed embodiments, the image processing device 30 may reduce the memory size of the first memory 34, in addition to the size of the look-up table 36. The memory used for the luminance and filtered masks 44 and 46 (reside in the first memory 34) approximately may be reduced by up to 64:1 ratio and the memory used for the table 36 approximately may be reduced by 16:1. Also, processing computations used to generate the filtered mask 46 may be significantly reduced and there may be reduced memory access times. The reduced computations used to generate the filtered mask 46 may allow the filtering operation to be performed in firmware.

In another embodiment, a YCC or other luminance-chroma image path ("luminance image path") may be processed in similar manner as the RGB image path described above. For example, the YCC color model (also known as YCbCr format), stores brightness (or luminance Y) information in one color value, and uses two other color values to store color information (chrominance Cb, Cr). For the luminance image path embodiment, the image processing device 30 of FIG. 1 may be modified in the following manner. Since the processing steps remain substantially the same, FIG. 1 and its reference numbers will be used to describe this embodiment. The digital color image 40 again may include the three input color values, but with one of the input color values already being luminance. Consequently, upon scaling down the digital color image 40 to obtain the scaled-down image 41, the scaled-down image 41 already contains luminance values without having to derive them, as undertaken with the above-described RGB image path embodiment. In other words, the RGB to luminance conversion step is eliminated, since the luminance values are already available. The scaled-down image 41 and the luminance mask 44 conceptually may be viewed as merging, leaving the scaled-down image 41 with the starting luminance values. Also, a luminance channel of pixels 50 in the digital color image 40 is processed through the look-up table 36 to obtain new output luminance values, as compared to the red, green and blue channels that are processed with the RGB image path embodiment. In this luminance path embodiment, the two chromatic channels may be left untouched.

With respect to the claims appended hereinafter, the following definitions are used to be generic to the RBG image path embodiment and luminance image path embodiment, both of which are generally described above. The term "starting luminance values" includes both (1) luminance values in the luminance mask 44 of the RGB image path embodiment and (2) luminance values in the scaled-down image 41 of the luminance path embodiment even though a conversion process may not be performed. The term "color values", whether they be input color values or output color values, includes both (1) the red, green and blue color values of the RGB image path embodiment and (2) the luminance value and its associated chrominance values in the luminance image path embodiment. The term "luminance scaled-down image", which includes the starting luminance values, includes both (1) the scaled-down luminance mask 44 derived directly from the scaled-down image 41 in the RGB image path embodiment and (2) the scaled-down image 41 derived directly from the digital color image 40 in the luminance image path embodiment. In the case of the RGB image path embodiment, the scaled-down image 41 will be referred to as the "intermediate scaled-down image" to distinguish it from the "luminance scaled-down image". In the RGB image path embodiment, the intermediate scaled-down image is part of the process, but it is not part of the process for the luminance image path embodiment. In some claims, the "expanded luminance values" may be referred to as the "luminance intensity values."

Referring to FIG. 1, a detailed description of the image processing device 30 now will be provided for the RGB image path embodiment. In one embodiment, the CPU 32 may be implemented in a digital signal processor. In one embodiment, the first memory 34 may comprise Dynamic Random Access Memory (DRAM) and the look-up table 36 may comprise Static Random Access Memory (SRAM) where the contrast adjustment curves may change and may be Read Only Memory (ROM) where the contrast adjustment curves are not changed, as will be described hereinafter. Non-volatile mass storage image (not shown) may also be included. In various embodiments, the interpolator 38 may be a hard-coded device, such as part of an Application Specific Integrated Circuit (ASIC). Alternatively, the interpolator may be implemented in firmware executed by the CPU 32 and stored in the first memory 34 during execution. In various embodiments, the processing of the digital color image 40 to produce the scaled-down image 41, the luminance mask 44, the filtered mask 46, and the expanded sub-image matrices 48 may be accomplished in firmware executed by the CPU 32. Alternatively, this image processing or portions thereof may be hard-coded in part of an ASIC. The image processing device 30 may also be implemented in software, such as in a software driver.

Depending on the application, there may be a number of possible sources of the digital color image 40, such as portable memory card, digital camera, other mobile device, scanner or a personal computer. Although one row of pixels 50 in the digital color image 40 is shown for illustration purposes, in one embodiment the digital color image 40 may have 1,036,800 pixels (1440×720 pixel array). Other sized pixel arrays, both larger and smaller, may be used. Each pixel 50 in the digital color image 40, using the RGB (Red, Green, Blue) color model or space, may contain three quantized input color values in R, in G, and in B. In one embodiment, each pixel 50 may include 24 bits (3 bytes), with each color being expressed by an eight-bit (1 byte) color value. Hence, each eight-bit color value may represent one of 256 possible signal levels (L=256), which allows for 256 tones or shades for each color. With 3 bytes per pixel, the digital color image 40 may be classified as a "3 Mbyte" image. Other quantization levels may be used for the RGB colors, either greater or less (e.g., 12 bytes per color/pixel) and one color may have a greater quantization level than another. In the image processing described hereinafter, the pixels 50 may be processed on a pixel-by-pixel basis, with the three input color values of each pixel being applied to three channels: R, G, and B channels 52, 54, and 56, respectively.

In one embodiment, a single look-up table 36 may be used for each of the three primary colors. The look-up table 36 may have a multiplicity of rows 58 and columns 60. Each column 60 may contain data for one of a plurality of contrast adjustment curves. In one embodiment shown in FIG. 1, the look-up table 36 may comprise a 33-by-256 memory array to store 33 contrast adjustment curves. In another embodiment, a 17-by-256 memory array may be used for the look-up table 36 to store 17 contrast adjustment curves. Both memory configurations of the look-up table 36 have significant memory savings over the size of memory that would be used without the disclosed embodiments. Each of the rows 58 intersecting the columns 60 are addressed and accessed by one of the quantized intensity levels of each of the input colors. Hence, in one embodiment, there may be 256 rows, since there are 256 intensity levels of each of the input color values.

The selected column(s) 60 in the interpolation process undertaken by the interpolator 38 [and therefore, a selected contrast adjustment curve(s)], is determined by the expanded luminance value of a pixel in one of the sub-image matrices 48 of the expanded filter mask that corresponds to a pixel being processed in the digital color image 40. There is a one-to-one pixel correspondence between the pixels in the expanded mask (but only one sub-image matrix 48 of the expanded mask may exist at a time) and the digital color image 40; hence, each pixel in the expanded sub-image matrices 48 has its corresponding pixel 50 in the digital color image 40. In one embodiment, each expanded luminance value may have 8 bits (256 quantized levels). With respect to 33 levels of the expanded luminance value, some of the bits (for example, 5 bits) of the expanded luminance value may select a specific one of the columns 60 (interpolation may not be performed). With respect to the remaining 223 levels of the expanded luminance value, interpolation between adjacent columns 60 may be used. In other words, interpolation is used to compensate for reducing the number of columns that would be used without the disclosed embodiments.

As shown in FIG. 1, for those levels that use interpolation, the first four bits of the expanded luminance value may select a first column 60 and the first four bits plus one more bit may be used to select a second, adjacent column 60. In other words, two conjunctive, one-dimensional (1D) tables are selected, with each 1D table having 256 entries representing one of the contrast adjustment curves. Generally, the contrast adjustment curves may be arranged to progressively change from column to column. For a given pixel 50 being processed, one of the input color values in R, in G, and in B is used to select the row 58. Hence, two digital curve values, selected using the input color value, of the two adjacent contrast adjustment curves, selected using a first portion of the expanded luminance value, may be fed to the interpolator 38. The remaining bits (the last four bits) of a second portion of the expanded luminance value may be used to conduct interpolation between the two selected curve values. The interpolator 38 provides as an output the interpolated value which is distributed between the selected two curve values based upon the second portion of the expanded luminance value. Thereafter, the interpolated value is used to transform one of the input color values in R, in G, and in B of a given pixel 50 to one of the output color values outR, outG, and outB.

In one embodiment, the same set of contrast adjustment curves may be accessed (addressed) in the look-up table 36 for use with all three input color values of a given pixel 50. The first portion of the expanded luminance values may be used to select the same two contrast adjustment curves for the three input color values at a given pixel 50. However, each of the input color values of a given pixel 50, if different in intensity levels, selects different rows 58 of the two selected contrast adjustment curves. In one embodiment, the output color values may be substituted back into the memory location for the pixel 50 in the first memory 34. With the completion of a channel-by-channel, pixel-by-pixel image processing of the pixels 50 of the digital color image 40, a contrast enhanced digital color image is formed with the output color values. The results of using the reduced-size look-up table 36 may be similar to what would result from using a full sized look up table.

Figure 2:
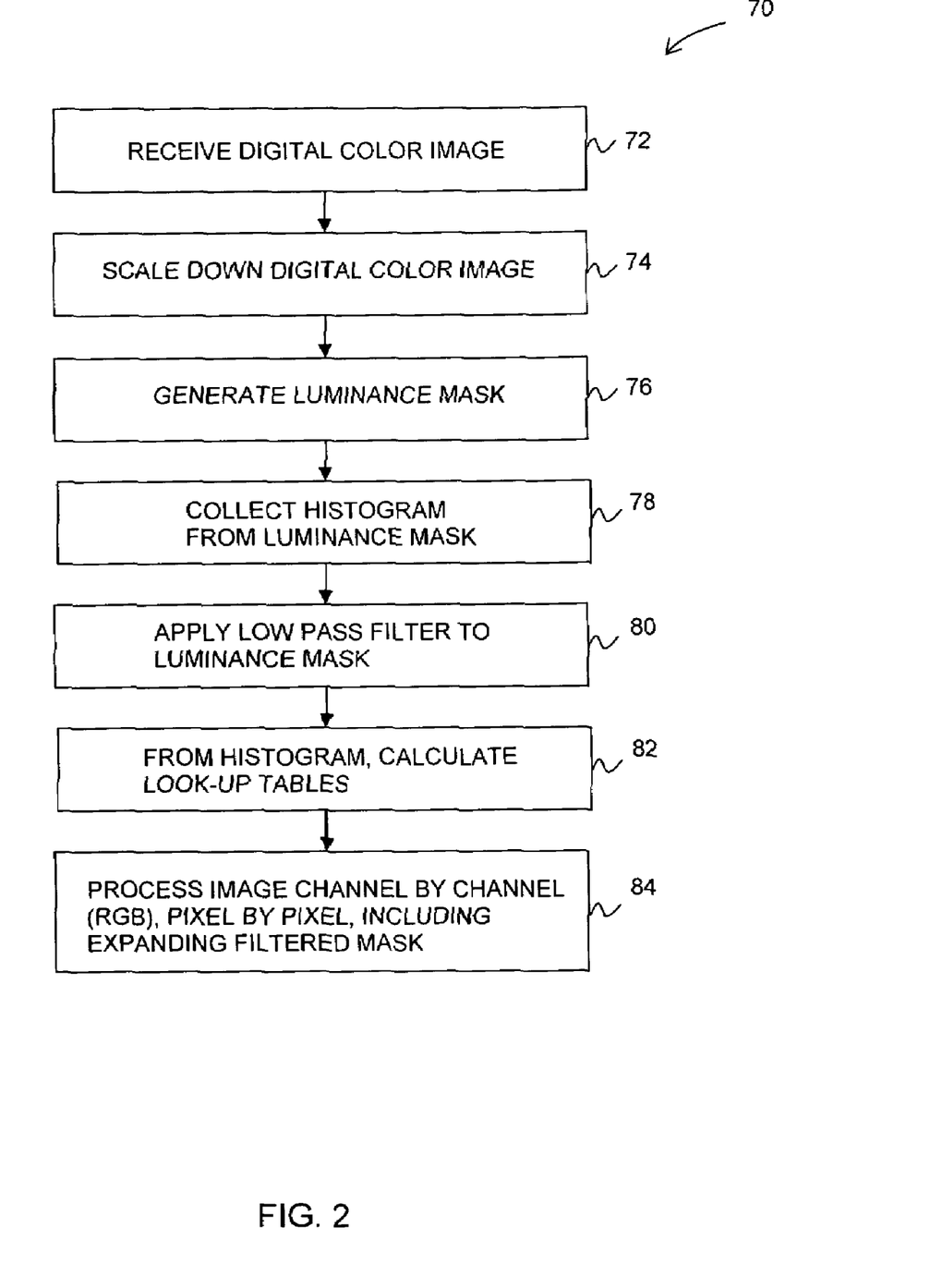
FIG. 2 illustrates an embodiment of a method disclosed in a flow chart of computer programs that may be used in image processing device of FIG. 1.

Referring to FIGS. 1 and 2, stages of a firmware process 70 are described for the RGB image path. Where there is a difference when other color models are used, it is noted. The processing stages of this firmware may represent computer program instructions or group of instructions that cause the image processing device 30, the CPU 32, and/or other components, to perform an action(s) and/or make decisions. The stages of the firmware process 70 will describe how the luminance mask 44 and filtered mask 46 are scaled down and how, in some applications, a two dimensional (2D) look-up table may be created from image histogram prior to channel-by-channel, pixel-by-pixel processing of the digital color image 40, which includes expanding the filtered mask to generate the expanded image matrix 48. The reduction in size of these masks may result in reduced memory usage of the first memory 34 and reduced computations for the filtering process and therefore reduced processing time.

At a stage 72 of FIG. 2, the digital color image 40 is received and placed in the first memory 34 for image enhancement. At a stage 74 of FIG. 2, the digital color image 40 is scaled down to generate the scaled-down image 41. The scaled-down image 41 may also be described as a thumbnail or condensed image. The scaled-down image 41 may have a subset of the pixels 50. In one embodiment, the digital color image 40 may be scaled down by the ratio of 8:1. To accomplish this, only every $8^{th}$ pixel in both the rows and columns of the digital color image 40 are retained, with the other pixels being discarded. In other words, focusing on an illustrative 8-by-8 pixel sub-image of the digital color image 40, one pixel may be retained on each of the four corners or four pixels in the center of the 8-by-8 pixel sub-image. In another embodiment, the digital color image 40 may be scaled down by a ratio of 4:1. In an illustrative 4-by-4 sub-image of the digital color image 40, one pixel may be retained on each of the four corners or four pixels in the center of the 4-by-4 pixel sub-image. The choice of between a ⅛ or ¼ scaled-down image 41 or other size image 41 may depend on the size of the digital color image 40. Other ratios and pixel selection criterion may be used.

In one embodiment, the subset of pixels 50 of the digital color image 40 selected for the use in the scaled-down image 41 may retain their associated, original input color values found in image 40. In another embodiment, for example, a neighboring function may be applied to generate input color values for the retained pixel 50 of the image 41 that not only are a function the original color values of the retained pixel 50, but also are a function of the original color values of the surrounding pixels 50 to be deleted. In summary, as a result of this stage 74, the scaled-down color image 41 is generated.

At a stage 76 of FIG. 2, the luminance mask 44 of the luminance channel 42 may be derived directly from the scaled-down color image 41. The CPU 32 converts the scaled-down color image data to starting luminance values Y of a YIQ (luminance, inphase, quadrature, respectively) color space, using, for example, an RGB (Red, Green, Blue) conversion factor 0.299*R+0.587*G+0.114*B. Other color spaces or space conversions may be used that result in separate luminance or intensity components. The pixels of the scaled-down color image 41 may be processed one-by-one to generate the luminance mask 44. There is a one-to-one pixel correspondence between pixels in the scaled-down color image 41 and the luminance mask 44. More specifically, the input color values of a given pixel in the scaled-down color image 41 are used to derive the starting luminance value in the correspondingly located pixel in the luminance mask 44. In one embodiment, each starting luminance value may have 256 quantized levels. In the luminance image path embodiment wherein the color model being used with the digital color image already has the luminance value, stage 76 may be eliminated.

At a stage 78 of FIG. 2, in one embodiment, a histogram may be collected from the luminance mask in the case where the contrast adjustment curves are to be updated in the look-up table 36 based upon the current digital color image 40 being processed. This allows for image dependent color adjustment. In embodiments where generalized contrast adjustment curves are used which are applicable to all digital color images 40 received, this stage 78 may be skipped.

At a stage 80 of FIG. 2, a low pass filtering operation is performed on the luminance mask 44 to generate a filtered mask 46 of smoothed luminance values. In one embodiment, 3×3 or 5×5 Gaussian smoothing may be conducted to achieve a similar result as may be achieved by smoothing over some larger pixel areas. The Gaussian smoothing operation is used to blur images and reduce details and noise. A Gaussian distribution, which is a neighboring unction, is convolved with a neighborhood of pixels, which involves moving a small 3×3 pixels or 5×5 pixels mask about the reduced-size luminance mask 44, with the small mask being centered on one pixel at a time. A degree of smoothing may be determined by a standard deviation of the Gaussian operation applied within the small mask, with the Gaussian operation outputting a weighted average of each pixel's neighborhood that is weighted more toward the values of the central pixels. The computations (3 pixels by 3 pixels mask or 5 pixels by 5 pixels mask) are sufficiently small that they may be implemented in firmware instead of using an ASIC or hardware. In summary, at step 80, the filtered mask 46, as a result of using a low pass filter such as a Gaussian smoothing filter, may be a low pass version of the luminance mask 44. In one embodiment, the smoothed luminance values may have 256 quantized levels.

At a stage 82 of FIG. 2, the look-up table 36 is updated using information extracted from the collected histogram in the case where the contrast adjustment curves are to be updated in the look-up table 36 based upon the digital color image 40 being currently processed. In the embodiments where generalized contrast adjustment curves are used which are applicable to all digital color images 40 received, this stage 82 may be skipped. In general, the stages 74 through 82 prepare the suitable mask and tables for a stage 84, described below. In other words, stages 74 through 82 happen before the stage 84.

At the stage 84 of FIG. 2, in one embodiment, four neighboring pixels in the filtered mask 46 at a time are expanded to full resolution "on the fly" to generate the expanded sub-image matrix 48 of pixels, which may be 8 pixels×8 pixels or 4 pixels×4 pixels, for example. This is undertaken at the same time as the contrast enhancement processing the digital color image 40 is undertaken. Each of the pixels 85 in expanded sub-image matrix 48 has a corresponding pixel 50 in original image 40. In the embodiment where the luminance mask 44 was derived by the digital color image 40 being reduced by an 8:1 ratio, then the filtered mask 46 is expanded by a 1:8 ratio in a reverse process. As previously described, the accumulation of the sub-image matrices defines an expanded mask (but for this embodiment, one in which one sub-image exists at a time).

This expansion process may be viewed as interposing additional pixels in the array of pixels for the filtered mask 46, in addition to including the four pixels of the filtered mask 46, so as to create the new array of pixels 85 for the expanded sub-image matrix 48. As previously mentioned, the pixels 85 include luminance values, which are called "expanded luminance values" to distinguish them from the "smoothed luminance values" of the filtered mask 46. The expanded luminance values of the added pixels 85 interposed between pixels of the filtered mask 46 may be generated by interpolating between the smoothed luminance values of the pixels of the filtered mask 46. Additionally, for the four pixels carried over from the filtered mask 46, their associated smoothed luminance values become expanded luminance values of the sub-image matrix 48 without modification. In summary, a given pixel 85 contains the expanded luminance value to be used in the processing of the input color values of the pixel 50 correspondingly located in the digital color image 40. In other words, the pixel 85 and 50 are located in the same row and the same column of their respective sub-image matrices, with the expanded sub-image matrix 48 corresponding to a sub-image matrix of the digital color image 40.

At a stage 84 of FIG. 2, a previously mentioned, only an 8×8 or 4×4 sub-image matrix 48 is created and stored at a time, rather than the entire expanded filter mask. This may save a substantial amount of memory.

Once a sub-image matrix 48 of the expanded filtered mask has been created by expansion on fly, corresponding pixels 50 in digital color image 40 will be processed through the two dimensional look-up table 36. Their input color values in R, in G, and in B each select one of the rows 58 and the associated expanded luminance value of corresponding pixel 85 of sub-image matrix 48 selects the column (or columns in the case of interpolation) to provide as outputs three curve values for contrast transformation of the three input color values to generate three output color values outR, outG, and outB. In the case of the digital color image 40 using a color model with a luminance value, then only one channel, the luminance channel, is processed using the look up table to provide luminance output values In one embodiment, the curve values may be used as the transformation function T in the following image processing function of: g(x,y)=T[f(x,y)], where f(x,y) is the input color values at a given pixel (x,y) of the digital color image 40 and g(x,y) is the resulting output color values at a corresponding pixel (x,y) in the contrast enhanced image. The contrast enhanced image may take the place of the digital color image 40 in the first memory; hence, the contrast enhanced image is not separately shown in FIG. 1.

Referring to FIG. 1, as previously described, each column 60 of the look-up table 36 stores data for one of the digitized contrast adjustment curves used for contrast enhancement in the spatial domain. Hence, each contrast adjustment curve is a 1 D look-up table with 256 stored entries. The contrast adjustment curves may be generalized to be used with all received digital color images 40 or may be customized to a particular received image with use of the previously described histograms. As previously mentioned, the transformation function T may be a contrast modification function which provides an intensity level transformation or mapping function to produce a processed digital image with differing contrasts from that of the digital color image 40. For example, the transformation function T may include many different contrast modification functions, such as amplitude scaling functions including simple intensity transformations of a contrast stretching function to increase the dynamic range of the intensity levels of a low contrast image being processed, a contrast compression function to decrease the dynamic range; histogram modifications functions, such as histogram equalization; and like contrast modification functions. It is possible to have multiple contrast modification functions in two dimensional look-up table 36. Depending on which one or two columns are selected from the value of pixel 85, different transform function can be selected for different region of image 40. For example, shadow areas of the digital color image 40 may be lightened up by use of the contrast adjustment curves, while light regions may be left untouched.

Figure 3:
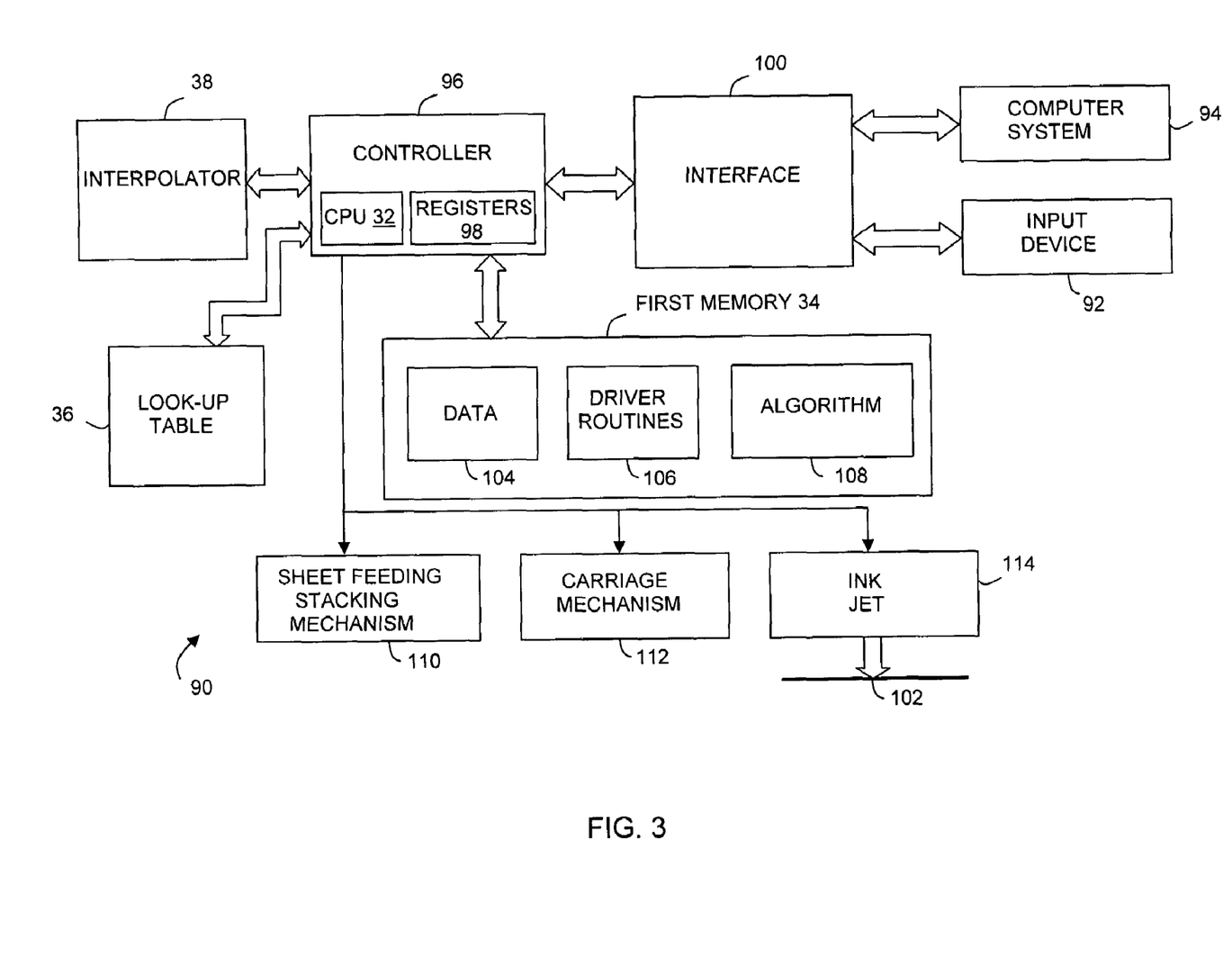
FIG. 3 is a diagram of an exemplary application of the image processing device of FIG. 1 implemented in an embodiment of a printer.

Referring to FIG. 3, an exemplary application of the image processing device 30 is shown wherein the device 30 is incorporated into an embodiment of a printer, printer 90. For example, the printer 90 may be an inkjet printer and more specifically an inkjet printer for printing digital color images or photographs, such as the PhotoSmart™ inkjet printer series manufactured by Hewlett-Packard Company. One feature of the printer 90 may be to allow a user to transfer digital color images 40 of FIG. 1 directly to the printer 90 from an input device 92, such as a portable memory card, digital camera or other mobile device without utilizing a computer system 94. Alternatively, the digital color images may originate from the computer system 94, such as a personal computer. The printer 90 may have a controller 96, which includes the CPU 32 and a plurality of registers 98 for temporary memory storage. The controller 96 may be coupled to the computer system 94 and input device 92 via an interface unit 100. The controller 96 also may be coupled to the first memory 34, the second memory in the form of the look-up table 36, and the interpolator 38. The interface unit 100 may facilitate the transferring of digital color images (and command signals) from the computer system 92 and/or digital color images from the input device 92. Regardless of the source, digital color images may be subject to image processing and color space conversion and then printed on a print medium 102.

The first memory 34 of the printer 90 may be divided into a plurality of storage areas that facilitate printer operations. The storage areas may include: (1) a data storage area 104 for storing the RBG digital color images, the scaled down images, the luminance masks, the filtered masks, the expanded mask and like data; (2) a storage area 106 for driver routines; and (3) a control storage area 108 that holds the computer programs and algorithms for the image processing described in FIG. 2 and for the control of the various mechanical mechanisms of the printer 90. Such mechanical mechanisms may include a sheet feeding-stacking mechanism 110, a carriage mechanism 112, and an inkjet printhead assembly 114. More specifically, the control storage area 108, in addition to the firmware for the image processing of FIG. 2, may contain the routines that control: (1) the sheet feeding stacking mechanism 110 for moving the medium 102 through the printer 90 from a supply or feed tray (not shown) to an output tray (not shown); and (2) the carriage mechanism 112 that causes the inkjet printhead assembly 114 to be moved across the print medium 102 on a guide rod (not shown). In operation, the printer 90 may respond to commands by printing full color images on the print medium 102 which is mechanically retrieved from the feed tray. The controller 96 may control the carriage mechanism 112 and media 102 movements and may activate the nozzles (not shown) of the printhead assembly 114 for ink drop deposition. The nozzles may be used to print each pixel location during one or more passes. Hence, the printhead assembly 114 may cause one or more swaths of ink droplets to be ejected onto the printing medium 102 to form a desired image.

The inkjet printhead assembly 114 may employ a plurality of print cartridges (not shown) each containing printheads, usually two to four, mounted in the printer carriage (not shown) to produce a full spectrum of colors. For example, in the printer 90 with four cartridges, each print cartridge may contain a different color ink, with the commonly used base colors being cyan, magenta, yellow, and black. In the printer 90 with two cartridges, one cartridge may contain black ink with the other cartridge being a tri-compartment cartridge containing the base color cyan, magenta and yellow inks, or alternatively, two dual-compartment cartridges may be used to contain the four color inks. In addition, two tri-compartment cartridges may be used to contain six base color inks, for example, black, cyan, magenta, yellow, light cyan and light magenta. Further, other combinations may be employed depending on the number of different base color inks to be used.

The base colors may be produced on the media 102 by depositing a drop of the desired color onto a dot location, while secondary or shaded colors are formed by depositing multiple drops of different base color inks onto the same or an adjacent dot location, with the overprinting of two or more base colors producing the secondary colors according to well established optical principles. To create a single dot on media having a color which makes use of a blend of two or more of the colors provided by different print cartridges, the nozzles on each of the cartridges are aligned so that a dot ejected from a selected nozzle in one cartridge aligns with a dot ejected from a corresponding nozzle in another cartridge.

In order to reproduce a received output RGB color value from one of the pixels of the enhanced color image, the printer 90 may convert or map the RGB color value into a color command that is recognized by the printer 90. A color management system (not shown), implemented in firmware or hardware stored in the first memory 34, may map the RGB output color values of the enhanced color image to cyan, magenta and yellow (CMY) values. The color management system also may adjust the CMY values in accordance with a predetermined calibration function or lookup table to assist in the printed colors appearing the same as the RGB colors displayed on a display device (e.g., monitor). An additional value may be supplied for a black (K) dot to be applied at a pixel location.

As previously described, the RGB color space uses as its primary colors red, green, and blue. These three colors are the primary "additive" colors. In devices that use projected light to produce an image (for example, televisions or computer monitors), the complete spectrum of colors may be reproduced using red, green, and blue. All three primary additive colors combine to form white. Any other color may be produced by combining different amounts of the three primary colors.

CMY is a color space that uses as its primary colors cyan, magenta and yellow. These three colors are the primary "subtractive" colors, because when printed on paper, the CMY colors subtract some colors while reflecting others. In theory, all three primary subtractive colors combine to form black. However, it is sometimes difficult to get a satisfying black, so many subtractive color-based systems add a "true" black color, K, hence, the color set CMYK. The CMYK color set is sometimes called "process color."

Measurement based color systems measure color either with a colorimeter or a spectrophotometer. Three components are used to measure color: a light source, a color sample and an observer. CIE (International Commission on Illumination) Colorimetric Color Space is a color space based on color measurement and its relation to human color perception. Common CIE coordinate systems are CIE L*a*b*, CIE L*C*h°, CIE XYZ, CIE L*u*v* and CIE color difference equations such as $.DELTA.E_{a,b}*$ or $.DELTA.E_{u,v}*$. The L*a*b* uniform color space was standardized by the CIE in 1976 and describes color data with variables that are well correlated with the color's perceptual attributes, where: L*=lightness (0-100), a*=redness-greenness (not bounded), and b*=yellowness-blueness (not bounded).

For RGB color space describe with respect to FIG. 1, there may be a one-to-one mapping between color values in the RGB color space and L*a*b* color space. There also may be a one-to-one mapping from L*a*b* color space to a printing system's CYMK color space.

Thus, it can be seen from the above descriptions, embodiments of an arrangement to adjust contrast of a digital color image in an imaging device has been described. While the method has been described in terms of the foregoing embodiments, those skilled in the art will recognize, from understanding this disclosure, that the arrangement is not limited to the embodiments described. The arrangement may be practiced with modification and alteration within the spirit and scope of the appended claims. Thus, the description is to be regarded as illustrative instead of restrictive.

The invention claimed is:

1. A method, comprising:
scaling up at least one portion of an array of luminance values to generate a matrix having a plurality of expanded luminance values; and
adjusting at least one value of a first digital image using data selected by one of the expanded luminance values as part of generating a second digital image, the second digital image comprising an adjustment of the first digital image.

2. The method according to claim 1, further comprising:
scaling down the first digital color image having a first array of pixels to form a luminance scaled-down image, each of the pixels of the first array including at least one input color value;
filtering the luminance scaled-down image to form a filtered mask having a plurality of smoothed luminance values; and
wherein the at least one portion of the array of luminance values is at least one portion of the filtered mask; the matrix having the plurality of expanded luminance values is a sub-image matrix having the plurality of expanded luminance values; the at least one value is at least one input color value; and the data include at least one contrast adjustment curve.

3. The method according to claim 2, wherein the adjusting of the at least one input color value using the at least one contrast adjustment curve includes:
selecting a pair of contrast adjustment curves based at least in part on the one expanded luminance value;
selecting a pair of adjustment values from the pair of contrast adjustment curves based at least in part on the at least one input color value;
interpolating to generate an interpolated value between the pair of adjustment values based at least in part on the one expanded luminance value; and
modifying the at least one input color value using the interpolated value to generate at least one output color value.

4. The method according to claim 3, wherein the selecting of the pair of contrast adjustment curves includes using a first portion of the one expanded luminance value to select the two contrast adjustment curves; and the interpolating to generate the interpolated value between the pair of adjustment values includes using a second portion of the one expanded luminance value to select the interpolated value.

5. The method according to claim 2, wherein the scaling down of the digital color image to form the luminance scaled-down image includes selecting a subset of the pixels of the first array to form an intermediate scaled-down image and converting the intermediate scaled-down image to the luminance scaled-down image having a plurality of starting luminance values.

6. The method according to claim 2, wherein the scaling down of the digital color image to form the luminance scaled-down image includes selecting a subset of the pixels of the first array to form the luminance scaled-down image having a plurality of starting luminance values.

7. The method according to claim 2, wherein the luminance scaled-down image has a second array of pixels, with a number of pixels in the second array being less than a number of pixels in the first array.

8. The method according to claim 7, wherein the scaling down of the digital color image to form the luminance scaled-down image includes scaling down a plurality of rows and a plurality of columns of the first array of pixels by an 8:1 ratio to generate the second array of pixels.

9. The method according to claim 7, wherein the scaling down of the digital color image to form the luminance scaled-down image includes scaling down a plurality of rows and a plurality of columns of the first array of pixels by a 4:1 ratio to generate the second array of pixels.

10. The method according to claim 7, wherein the filtering of the luminance scaled-down image to form the filtered mask includes forming the filtered mask to have a third array of pixels with the plurality of smoothed luminance values, the pixels of the third array having a one-to-one pixel correspondence the pixels of the second array.

11. The method according to claim 10, wherein the filtering of the luminance scaled-down image to form the filtered mask include filtering the luminance scaled-down image with a Gaussian function utilizing a neighboring mask of 3 pixels by 3 pixels.

12. The method according to claim 10, wherein the filtering of the luminance scaled-down image to form the filtered mask include filtering the luminance scaled-down image with a Gaussian function utilizing a neighboring mask of 5 pixels by 5 pixels.

13. The method according to claim 10, wherein the scaling up of the at least one portion of the filtered mask to generate the sub-image matrix includes adding a plurality of interposed pixels to a group of the third array pixels forming the at least one portion and interpolating the smoothed luminance values of the filtered mask to generate the expanded luminance values for the interposed pixels.

14. The method according to claim 13, wherein the sub-image matrix includes a fourth array of pixels having the expanded luminance values, with each of the pixels for the fourth array having a corresponding pixel in the first array of pixels.

15. The method according to claim 2, wherein the scaling up of the at least one portion of the filtered mask to generate the sub-image matrix includes scaling up a plurality of portions of the filtered mask one at a time to generate a plurality of sub-image matrices.

16. The method according to claim 2, wherein the at least one input color value includes a red, a green, and a blue input color value and the adjusting of the at least one input color value using the at least one contrast adjustment curve includes adjusting the red, the green and the blue input color values with the at least one contrast adjustment curve to generate a red, a green and a blue output color value.

17. The method according to claim 16, wherein the luminance scaled-down image includes a plurality of starting luminance values; and wherein the scaling down of first digital color image to form the luminance scaled-down image further includes computing each of the starting luminance values from the red, the green and the blue input color values of one of the pixels of the first array.

18. The method according to claim 2, wherein the at least one input color value includes at least an input luminance value and the adjusting of the at least one input color value using the at least one contrast adjustment curve includes adjusting the input luminance value with the at least one contrast adjustment curve to generate an output luminance value.

19. The method according to claim 18, wherein the luminance scaled-down image includes a plurality of starting luminance values; and wherein the scaling down of first digital color image to form the luminance scaled-down image further includes only selecting a subset of the pixels of the first array to form the luminance scaled-down image.

20. A method for adjusting an image having a first array of pixels with each pixel containing a plurality of input values, comprising:
- selecting a pair of contrast adjustment curves based at least in part on a luminance intensity value corresponding to the plurality of input values;
- selecting a pair of adjustment values from the pair of contrast adjustment curves based at least in part on one of the plurality of input values;
- interpolating to generate an interpolated value between the pair of adjustment values based at least in part on the luminance intensity value; and
- modifying the one input value by the interpolated value to generate an output value.

21. The method according to claim 20, wherein the plurality of input values includes a plurality of input color values.

22. The method according to claim 21, further comprising:
- scaling down the image to form a luminance scaled-down image;
- filtering the luminance scaled-down mask to form a filtered mask having a plurality of smoothed luminance values; and
- scaling up a plurality of portions of the filtered mask to generate a plurality of sub-image matrices having a plurality of luminance intensity values including the luminance intensity value corresponding to the plurality of input color values.

23. The method according to claim 21, wherein the plurality of input color values includes a red, a green and a blue color input value.

24. The method according to claim 21, wherein the plurality of input color values includes at least a luminance input value.

25. The method according to claim 21, wherein the selecting of the pair of contrast adjustment curves includes using a first portion of the luminance intensity value to select the two contrast adjustment curves; and the interpolating to generate the interpolated value between the pair of adjustment values includes using a second portion of the luminance intensity value to select the interpolated value.

26. A method, comprising:
- receiving in a memory a first digital color image having a first array of pixels, with each of the first array pixels containing a plurality of input color values;
- scaling down the first digital color image with a processor to create in the memory a luminance scaled-down image having a second array of pixels, a number of the pixels of the second array being less than a number of the pixels of the first array;
- filtering the luminance scaled-down image with the processor to generate a filtered mask in the memory having a third array of pixels with a one-to-one pixel correspondence to the second array of pixels, each of the third array pixels containing one of a plurality of smoothed luminance value;
- scaling up a plurality of portions of the filtered mask one at a time with the processor to generate a plurality of sub-image matrices in the memory, each of the sub-image matrices having a fourth array of pixels with each of the fourth array pixels correspondence to one of the first array pixels and containing one of a plurality of expanded luminance values; and
- modifying with the processor one of the plurality of input color values by at least one contrast adjustment curve stored in a look-up table and selected by one of the expanded luminance values to generate an output color value for a second digital color image.

27. The method according to claim 26, wherein the modifying the one input color value by the at least one contrast adjustment curve includes:
- selecting with the processor a pair of contrast adjustment curves based at least in part on the one expanded luminance value;
- selecting with the processor a pair of adjustment values from the pair of contrast adjustment curves based at least in part on the one input color value;
- interpolating with an interpolator to generate an interpolated value between the pair of adjustment values based at least in part on the one expanded luminance value; and
- modifying with the processor the one input color value by the interpolated value to generate the output color value.

28. The method according to claim 27, wherein the interpolating with an interpolator to generate the interpolated value includes using a hard-coded interpolator.

29. The method according to claim 28, wherein the selecting with the processor of the pair of contrast adjustment curves based at least in part on the one expanded luminance value includes using a first group of bits of the one expanded luminance value to select the pair of contrast adjustment curves, with a range of possible contrast adjustment curves being defined by a number of bits in the first group; and the interpolating with the interpolator to generate the interpolated value includes using a second group of bits of the one expanded luminance value to determine the interpolated value, with a range of possible interpolated values being defined by a number of bits of the second group.

30. The method according to claim 26, wherein the scaling down of the digital color image with the processor to create in the memory the luminance scaled-down image includes deriving with the processor and storing in the memory an intermediate scaled-down image of a subset of the first array pixels and converting the intermediate scaled-down image to the luminance scaled-down image, the luminance scaled-down image having a plurality of starting luminance values.

31. The method according to claim 26, wherein the scaling down of the digital color image with the processor to create in the memory the luminance scaled-down image includes selecting a subset of the first array pixels to form the luminance scaled-down image, the luminance scaled-down image having a plurality of starting luminance values.

32. The method according to claim 26, wherein the scaling down of the digital color image to create the luminance scaled-down image includes selecting a subset of the first array of pixels to create the second array of pixels and deleting a remainder of the first array of pixels.

33. The method according to claim 26, wherein the scaling up of the plurality of portions of filtered mask to generate the plurality of sub-image matrices includes for each of the sub-image matrices adding a plurality of interposed pixels to the third array of pixels to generate the fourth array of pixels and interpolating the smoothed luminance values from the third array of pixels to generate the expanded luminance values for the interposed pixels.

34. The method according to claim 26, wherein the plurality of input color values includes a red color value, a green color value, and a blue color value.

35. The method according to claim 26, wherein the plurality of input color values includes at least an input luminance value.

36. An image processing device, comprising:
- a scaling-up device for scaling up at least one portion of an array of pixels having a plurality of corresponding luminance values by adding a number of the pixels to the array to generate a matrix having a plurality of expanded luminance values; and an adjusting device for adjusting at least one input value using data selected by one of the expanded luminance values.

37. The image processing device according to claim 36, further comprising:

a scaling-down device for scaling-down a digital color image having a first array of pixels to a luminance scaled-down image having a plurality of starting luminance values, the first array pixels each having at least one input color value;

a filtering device for filtering the starting luminance values to form a filtered mask having a plurality of smoothed luminance values, the filtered mask having a second array of pixels; and wherein the at least one portion of the array of pixels having the plurality of corresponding luminance values includes at least a portion of the filtered mask; the matrix having the plurality of expanded luminance values includes a sub-image matrix having the plurality of expanded luminance values; the at least one input value includes at least one input color value of one of the first array pixels; and the data include at least one contrast adjustment curve.

38. The image processing device according to claim 37, wherein the adjusting device includes:

a processor adapted for selecting a pair of contrast adjustment curves based at least in part on the one expanded luminance value;

the processor further adapted for selecting a pair of adjustment values from the pair of contrast adjustment curves based at least in part on the at least one input color value;

an interpolator adapted for generating an interpolated value between the pair of adjustment values based at least in part on the one expanded luminance value; and the processor further adapted for modifying the at least one input color value by the interpolated value to generate at least one output color value.

39. The image processing device according to claim 37, wherein the at least one input color value includes a red, a green and a blue input color value and wherein the scaling-down device includes the processor further adapted for reducing the digital color image to an intermediate scaled-down image having a subset of the first array pixels and the processor further adapted for deriving one of the starting luminance values from the red, the green and the blue input color values at each of the first array pixels of the subset.

40. The image processing device according to claim 37, wherein filtering device includes a Gaussian function applied by a neighboring mask configured to be 3 pixels by 3 pixels.

41. The image processing device according to claim 37, wherein filtering device includes a Gaussian function applied by a neighboring mask configured to be 5 pixels by 5 pixels.

42. An apparatus for adjusting a digital color image having a first array of pixels with each of the pixels having a plurality of input color values, comprising:

means for selecting a pair of contrast adjustment curves based at least in part on a luminance intensity value corresponding to the plurality of input color values;

means for selecting a pair of adjustment values from the pair of contrast adjustment curves based at least in part on one of the plurality of input color values;

means for interpolating to generate an interpolated value between the pair of adjustment values based at least in part on the luminance intensity value; and means for modifying the one input color value by the interpolated value to generate an output color value.

43. The apparatus according to claim 42, further comprising:

means for scaling-down the digital color image to form a luminance scaled-down image with a plurality of starting luminance values;

means for filtering the starting luminance values to form a filtered mask having a plurality of smoothed luminance values, the filtered mask having a second array of pixels; and means for scaling up a plurality of portions of the filtered mask to generate one at a time a plurality of sub-image matrices having the plurality of luminance intensity values by adding a number of the pixels of the second array.

44. The apparatus according to claim 43, wherein the plurality of input color values includes a red, a green and a blue input color value and wherein the means for scaling-down includes means for reducing the digital color image to an intermediate scaled-down image having a subset of the first array pixels and means for deriving a starting luminance value from the red, the green and the blue input color values at each of the first array pixels of the subset.

45. The apparatus according to claim 43, wherein the plurality of input color values includes at least an input luminance value and wherein the means for scaling-down is operable for reducing the digital color image to the luminance scaled-down image by selecting a subset of the first array pixels.

46. An imaging processing device, comprising:

a processor operable to execute an image processing program including a scaling-up routine to generate a plurality of matrices having a plurality of expanded luminance values from a plurality of portions of an array of luminance values and an adjusting routine to adjust one of a plurality of input values using an interpolated value to generate an output value;

a first memory, coupled to the processor, to store the array of luminance values and the plurality of matrices;

a second memory, coupled to the processor, to store a plurality of one-dimensional tables, with the processor being operable to access one or more values of the plurality of one-dimensional tables using one of the expanded luminance values and the one input value; and an interpolator, coupled to the processor, to generate the interpolated value from the one or more values of the plurality of one-dimensional tables.

47. An imaging processing device of claim 46, wherein the processor is adapted to execute the image processing program to modify a digital color image having a first array of pixels each with a plurality of input color values, the image processing program further includes a scaling-down routine to generate a luminance scaled-down image having a plurality of starting luminance values from the digital color image and a filtering routine to generate a filtered mask having a plurality of smoothed luminance values from the luminance scaled-down image; and wherein the plurality of matrices includes a plurality of expanded sub-image matrices having the plurality of expanded luminance values; the plurality of portions of an array of luminance values includes a plurality of portions of the filtered mask; the one of a plurality of input values includes one of the input color values; the output value includes an output color value; the first memory is further adapted to store the digital color image, the luminance scaled-down image, the filtered mask, and the sub-image matrices; the plurality of one-dimensional tables includes a plurality of contrast adjustment curves and the one or more values of the plurality of one-dimensional tables includes a pair of adjustment values from a pair of the contrast adjustment curves.

48. The image processing device according to claim 47, wherein a first portion of the one expanded luminance value selects the two contrast adjustment curves and a second portion of the one expanded luminance value selects the interpolated value.

49. The image processing device according to claim 47, wherein the scaling-down routine is operable to generate the luminance scaled-down image with a second array of pixels, with a number of pixels in the second array being less than a number of pixels in the first array.

50. The image processing device according to claim 49, wherein the scaling-down routine is operable to scale down the first array of pixels by an 8:1 ratio to generate the second array of pixels.

51. The image processing device according to claim 49, wherein the scaling-down routine is operable to scale down the first array of pixels by a 4:1 ratio to generate the second array of pixels.

52. The image processing device according to claim 47, wherein the scaling-down routine further includes a condensing routine operable to generate an intermediate scaled-down image consisting of a subset of the first array pixels and a luminance-deriving routine operable to derive the plurality of starting luminance values from the intermediate scaled-down image to generate the luminance scaled-down image.

53. The image processing device according to claim 47, wherein the filtering routine is operable to filter the luminance scaled-down image with a Gaussian function utilizing a neighboring mask of 3 pixels by 3 pixels.

54. The image processing device according to claim 47, wherein the filtering routine is operable to filter the luminance scaled-down image with a Gaussian function utilizing a neighboring mask of 5 pixels by 5 pixels.

55. The image processing device according to claim 47, wherein the scaling-up routine is operable to add a plurality of interposed pixels in the filtered mask and to interpolate the smoothed luminance values of the filtered mask to generate the expanded luminance values for the interposed pixels.

56. The image processing device according to claim 47, wherein the plurality of input color values include a red, a green, and a blue input color value and the color adjusting routine is operable to use a plurality of the interpolated values to adjust the red, the green and the blue input color values to generate a red, a green and a blue output color value.

57. The image processing device according to claim 47, wherein the image processing device comprises a printer.

58. The image processing device according to claim 47, wherein the image processing device comprises an inkjet printer and the image processing device further comprises an input device, coupled to the processor, to provide the digital color image to the memory.

59. An article of manufacture, comprising:
a computer usable medium having a computer readable code embedded therein for image processing; and
the computer readable code including a scaling-up routine to generate a plurality of matrices having a plurality of expanded luminance values from a plurality of portions of an array of luminance values; and an adjusting routine to adjust one of a plurality of input values using an interpolated value to generate an output value.

60. The article of manufacture according to claim 59, wherein the computer readable code is adapted to modify a digital color image having a first array of pixels each with a plurality of input color values; and the image processing code further includes a scaling-down routine to generate a luminance scaled-down image having a plurality of starting luminance values from the digital color image and a filtering routine to generate a filtered mask having a plurality of smoothed luminance values from the luminance scaled-down image.

61. The article of manufacture according to claim 60; wherein the plurality of matrices includes a plurality of expanded sub-image matrices having the plurality of expanded luminance values; the plurality of portions of an array of luminance values includes a plurality of portions of the filtered mask; the one of a plurality of input values includes one of the input color values; the output value includes an output color value; the first memory is further adapted to store the digital color image, the luminance scaled-down image, the filtered mask, and the sub-image matrices; the plurality of one-dimensional tables includes a plurality of contrast adjustment curves and the one or more values of the plurality of one-dimensional tables includes a pair of adjustment values from a pair of the contrast adjustment curves.

62. The article of manufacture according to claim 61, wherein a first portion of the one expanded luminance value selects the two contrast adjustment curves and a second portion of the one expanded luminance value selects the interpolated value.

* * * * *

UNITED STATES PATENT AND TRADEMARK OFFICE
CERTIFICATE OF CORRECTION

| | | |
|---|---|---|
| PATENT NO. | : 7,433,513 B2 | Page 1 of 1 |
| APPLICATION NO. | : 11/030795 | |
| DATED | : October 7, 2008 | |
| INVENTOR(S) | : Guo Li | |

It is certified that error appears in the above-identified patent and that said Letters Patent is hereby corrected as shown below:

On the face page, in field (54), in "Title", in column 1, line 1, delete "LUMINACE" and insert -- LUMINANCE --, therefor.

In column 1, line 1, in "Title", delete "LUMINACE" and insert -- LUMINANCE --, therefor.

Signed and Sealed this

Third Day of March, 2009

JOHN DOLL
*Acting Director of the United States Patent and Trademark Office*